United States Patent
Shen et al.

(10) Patent No.: US 10,311,574 B2
(45) Date of Patent: *Jun. 4, 2019

(54) OBJECT SEGMENTATION, INCLUDING SKY SEGMENTATION

(71) Applicant: Adobe Inc., San Jose, CA (US)

(72) Inventors: Xiaohui Shen, San Jose, CA (US); Zhe Lin, Fremont, CA (US); Yi-Hsuan Tsai, Merced, CA (US); Kalyan K. Sunkavalli, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,206

(22) Filed: Dec. 22, 2017

(65) Prior Publication Data

US 2018/0137624 A1 May 17, 2018

Related U.S. Application Data

(63) Continuation of application No. 15/042,006, filed on Feb. 11, 2016, now Pat. No. 9,858,675.

(51) Int. Cl.
*G06K 9/00* (2006.01)
*G06T 7/11* (2017.01)
(Continued)

(52) U.S. Cl.
CPC ............ *G06T 7/11* (2017.01); *G06K 9/00697* (2013.01); *G06K 9/34* (2013.01); *G06K 9/6269* (2013.01); *G06K 9/6297* (2013.01); *G06N 3/0454* (2013.01); *G06N 7/005* (2013.01); *G06T 2207/20016* (2013.01); (Continued)

(58) Field of Classification Search
CPC ............. G06T 7/11; G06T 2207/20084; G06T 2207/20076; G06T 2207/20092; G06T 2207/20016; G06N 7/005; G06N 3/0454; G06K 9/34; G06K 9/00697; G06K 9/6297; G06K 9/6269
See application file for complete search history.

(56) References Cited

U.S. PATENT DOCUMENTS 5,697,001 A 12/1997 Ring et al.
9,659,364 B2 5/2017 Pekar et al.
(Continued)

OTHER PUBLICATIONS

"Notice of Allowance", U.S. Appl. No. 15/042,006, dated Aug. 23, 2017, 8 pages.
(Continued)

*Primary Examiner* — Aaron W Carter
(74) *Attorney, Agent, or Firm* — SBMC (57) ABSTRACT

A digital medium environment includes an image processing application that performs object segmentation on an input image. An improved object segmentation method implemented by the image processing application comprises receiving an input image that includes an object region to be segmented by a segmentation process, processing the input image to provide a first segmentation that defines the object region, and processing the first segmentation to provide a second segmentation that provides pixel-wise label assignments for the object region. In some implementations, the image processing application performs improved sky segmentation on an input image containing a depiction of a sky.

20 Claims, 6 Drawing Sheets (51) Int. Cl.
*G06K 9/62* (2006.01)
*G06K 9/34* (2006.01)
*G06N 3/04* (2006.01)
*G06N 7/00* (2006.01)

(52) U.S. Cl.
CPC .............. *G06T 2207/20076* (2013.01); *G06T 2207/20084* (2013.01); *G06T 2207/20092* (2013.01)

(56) References Cited

U.S. PATENT DOCUMENTS

| | | | |
|---|---|---|---|
| 9,858,675 B2 | 1/2018 | Shen et al. | |
| 9,972,092 B2* | 5/2018 | Lin | G06K 9/66 |
| 2004/0037460 A1* | 2/2004 | Luo | G06K 9/00228 |
| | | | 382/165 |
| 2005/0147298 A1* | 7/2005 | Gallagher | G06K 9/00664 |
| | | | 382/173 |
| 2008/0019574 A1* | 1/2008 | Scalise | G06K 9/00228 |
| | | | 382/118 |
| 2008/0019575 A1* | 1/2008 | Scalise | G06K 9/00234 |
| | | | 382/118 |
| 2008/0169912 A1 | 7/2008 | Kawasaki | |
| 2008/0170754 A1 | 7/2008 | Kawasaki | |
| 2008/0187198 A1 | 8/2008 | Grady et al. | |
| 2008/0218516 A1* | 9/2008 | Pfister | G06T 11/60 |
| | | | 345/426 |
| 2009/0208118 A1 | 8/2009 | Csurka | |
| 2010/0040285 A1* | 2/2010 | Csurka | G06K 9/00624 |
| | | | 382/170 |
| 2011/0013837 A1* | 1/2011 | Bergman | G06T 7/11 |
| | | | 382/173 |
| 2011/0033122 A1 | 2/2011 | Le Roux et al. | |
| 2012/0033875 A1 | 2/2012 | Bergman et al. | |
| 2012/0320055 A1 | 12/2012 | Pekar et al. | |
| 2013/0084007 A1* | 4/2013 | Salamati | G06T 7/162 |
| | | | 382/173 |
| 2014/0037198 A1* | 2/2014 | Larlus-Larrondo | G06K 9/00 |
| | | | 382/159 |
| 2015/0206315 A1* | 7/2015 | Price | G06T 7/162 |
| | | | 382/180 |
| 2016/0171706 A1* | 6/2016 | Somanath | G06T 7/11 |
| | | | 382/154 |
| 2016/0350930 A1* | 12/2016 | Lin | G06K 9/66 |
| 2016/0358337 A1* | 12/2016 | Dai | G06T 5/10 |
| 2017/0039723 A1 | 2/2017 | Price et al. | |
| 2017/0236287 A1 | 8/2017 | Shen et al. | |
| 2017/0294000 A1* | 10/2017 | Shen | G06T 11/001 |
| 2018/0253622 A1* | 9/2018 | Chen | G06K 9/4671 |

OTHER PUBLICATIONS

"Pre-Interview Communication", U.S. Appl. No. 15/042,006, dated Jun. 8, 2017, 3 pages.

Boykov,"An Experimental Comparison of Min-Cut/Max-Flow Algorithms for Energy Minimization in Vision", IEEE Transactions on Pattern Analysis and Machine Intelligence, vol. 26, No. 9, Sep. 2004, pp. 1124-1137.

Domke,"Learning Graphical Model Parameters with Approximate Marginal Inference", PAMI, Jan. 2013, 22 pages.

Zhou,"Learning Deep Features for Scene Recognition using Places Database", In NIPS, Dec. 16, 2014, 9 pages.

\* cited by examiner

OBJECT SEGMENTATION, INCLUDING SKY SEGMENTATION

RELATED APPLICATION

This application is a continuation of and claims priority to U.S. patent application Ser. No. 15/042,006, filed Feb. 11, 2016, entitled "Object Segmentation, Including Sky Segmentation", the entire disclosure of which is hereby incorporated by reference herein in its entirety.

BACKGROUND

Segmenting objects in an image can require a great deal of work. Segmenting refers to assigning labels describing objects that appear in an image. One type of object that can appear in an image is the sky. A sky region in an image, such as a photograph, is one of the most semantic regions that creative people, both professional and casual users, tend to edit. To edit a sky region, users typically are required to perform a large amount of work to segment the sky region. Segmenting the sky regions means assigning each pixel a sky or non-sky label. Segmentation problems arise due to a number of factors including a sky's large variation in appearance, and complicated boundaries with other regions or objects such as, for example, trees, mountains, water, and the like. Thus, users who wish to edit sky regions, as well as other objects appearing in an image, are often faced with a large and daunting task.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, in a digital medium environment including an image processing application that performs object segmentation on an input image, an improved object segmentation method implemented by the image processing application, the method comprising: receiving an input image that includes an object region to be segmented; processing the input image to provide a first segmentation that defines the object region, said processing comprising: parsing the input image to provide a probability mask which classifies individual pixels in the input image; determining, from a database, multiple images which have layouts at least similar to a layout of the input image, wherein the multiple images include respective masks; processing the respective masks to provide a weighted average mask; and combining the probability mask and the weighted average mask to provide the first segmentation; and processing the first segmentation to provide a second segmentation that provides pixel-wise label assignments for the object region.

In one or more other implementations, in a digital medium environment in which a computing device can use an image processing application to perform sky segmentation, one or more computer-readable storage media comprising instructions that are stored thereon that, responsive to execution by the computing device, perform operations comprising: receiving an input image that includes an object region to be segmented, the object region comprising a depiction of a sky; processing the input image to provide a first segmentation that defines the object region; and processing the first segmentation to provide a second segmentation that provides pixel-wise label assignments for the object region, wherein processing the first segmentation to provide the second segmentation comprises computing a color unary potential and computing a texture unary potential that represent a probability of a pixel in the input image being a part of the object region or not a part of the object region, and computing a pairwise term computed based on a gradient magnitude between adjacent pixels in the input image.

In one or more implementations, a system implemented in a digital medium environment including a computing device having an image processing application to enable sky segmentation, the system comprising: a processing system; one or more computer readable media storing instructions executable via the processing system to implement an image processing application configured to perform operations comprising: receiving an input image that includes an object region to be segmented, the object region comprising a depiction of a sky; processing the input image to provide a first segmentation that defines the object region, said processing comprising: parsing the input image to provide a probability mask which classifies individual pixels in the input image; determining, from a database, multiple images which have layouts at least similar to a layout of the input image, wherein the multiple images include respective masks; processing the respective masks to provide a weighted average mask; and combining the probability mask and the weighted average mask to provide the first segmentation; and processing the first segmentation to provide a second segmentation that provides pixel-wise label assignments for the object region, said processing the first segmentation comprising solving an energy function that includes a color unary potential and a texture unary potential that represent a probability of a pixel in the input image being a part of the object region or not a part of the object region, and a pairwise term computed based on a gradient magnitude between adjacent pixels in the input image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

In the description below, segmentation techniques are described in the context of segmenting a depiction of a sky that appears in an image. It is to be appreciated and understood, however, that the segmentation techniques can be utilized with depictions of objects other than a sky, without departing from the spirit and scope of the claimed subject matter.

As noted above, segmenting a depiction of a sky in an image can be an onerous task for a user due to a number of factors including a sky's large variation in appearance and complicated boundaries with other regions or objects such as, for example, trees, mountains, water, and the like. Thus, users who wish to edit sky regions, as well as other objects appearing in an image, are often faced with a large and daunting task. Previous approaches to segmenting an object, such as a depiction of a sky, usually face three challenges. First, it can be difficult to learn a classifier that can cover a large variation of sky appearances. As a result, the learned classifier may work on common cases such as a clear sky, but may fail on sky images with more dramatic appearances. Second, traditional classifiers are learned from patches or super pixels, and do not capture the global scene context of an image. Therefore, it is difficult for traditional classifiers to differentiate sky regions and non-sky regions with similar appearances, such as water surfaces with a reflection of the sky. Third, traditional classifiers produce results that are not sufficiently fine-grained and that do not have accurate boundaries, such as a boundary between a sky and a non-sky region.

Introduced here are techniques that address the drawbacks of previous approaches, such as those that are mentioned above. The techniques utilize a novel coarse-to-fine segmentation method in which an input image is processed to produce a first so-called coarse segmentation. The coarse segmentation is then processed to produce a second so-called fine segmentation.

The coarse segmentation step aims to roughly, yet robustly, localize sky regions in various conditions such as sunset, sunrise, skies with different cloud shapes and colors, skies with rainbows, lightning, or even the night sky. The coarse segmentation also aims to ensure that non-sky regions with similar sky-like appearances are correctly labeled (e.g., mountains in the far background that do not have clear boundaries with the sky, water surfaces with some reflections, and the like).

The fine-level segmentation step aims to produce pixel-level accurate sky masks to handle cases such as holes (e.g., sky regions that appear through tree branches), small objects in the sky, and sky boundaries. The sky/non-sky regions with the highest prediction confidences from the coarse segmentation results are sampled and used to train online classifiers to predict pixel-level probabilities of a pixel being sky or non-sky. A graphical model is then used to provide the final results.

In one or more embodiments, in the coarse segmentation process, an input image is received and processed to provide both a local cue and a global cue. The local cue is built by parsing the input image to obtain a probability map or mask defining sky and non-sky regions. The global cue is built through an image retrieval process that seeks to retrieve images that are similar in layout to the input image. This provides a weighted average sky mask. The weighted average sky mask from the global cue is combined with the sky probability mask from the local cue to provide the coarse segmentation. The coarse segmentation results capture global layout information in a manner that is more robust to sky appearance variations.

In one or more embodiments, in the fine segmentation process, the coarse segmentation results are used to learn online classifiers to provide, on a pixel-by-pixel basis, a probability of being sky or non-sky. The probabilities are then used by a graphical model to produce a refined segmentation map. Soft labels can be assigned around boundaries with alpha mattes to produce more visually pleasing results.

In one or more implementations, a digital medium environment includes an image processing application that performs object segmentation on an input image. An improved object segmentation method implemented by the image processing application comprises receiving an input image that includes an object region that is to be segmented by a segmentation process, processing the input image to provide a first segmentation that defines the object region, and processing the first segmentation to provide a second segmentation that provides pixel-wise label assignments for the object region.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 1:
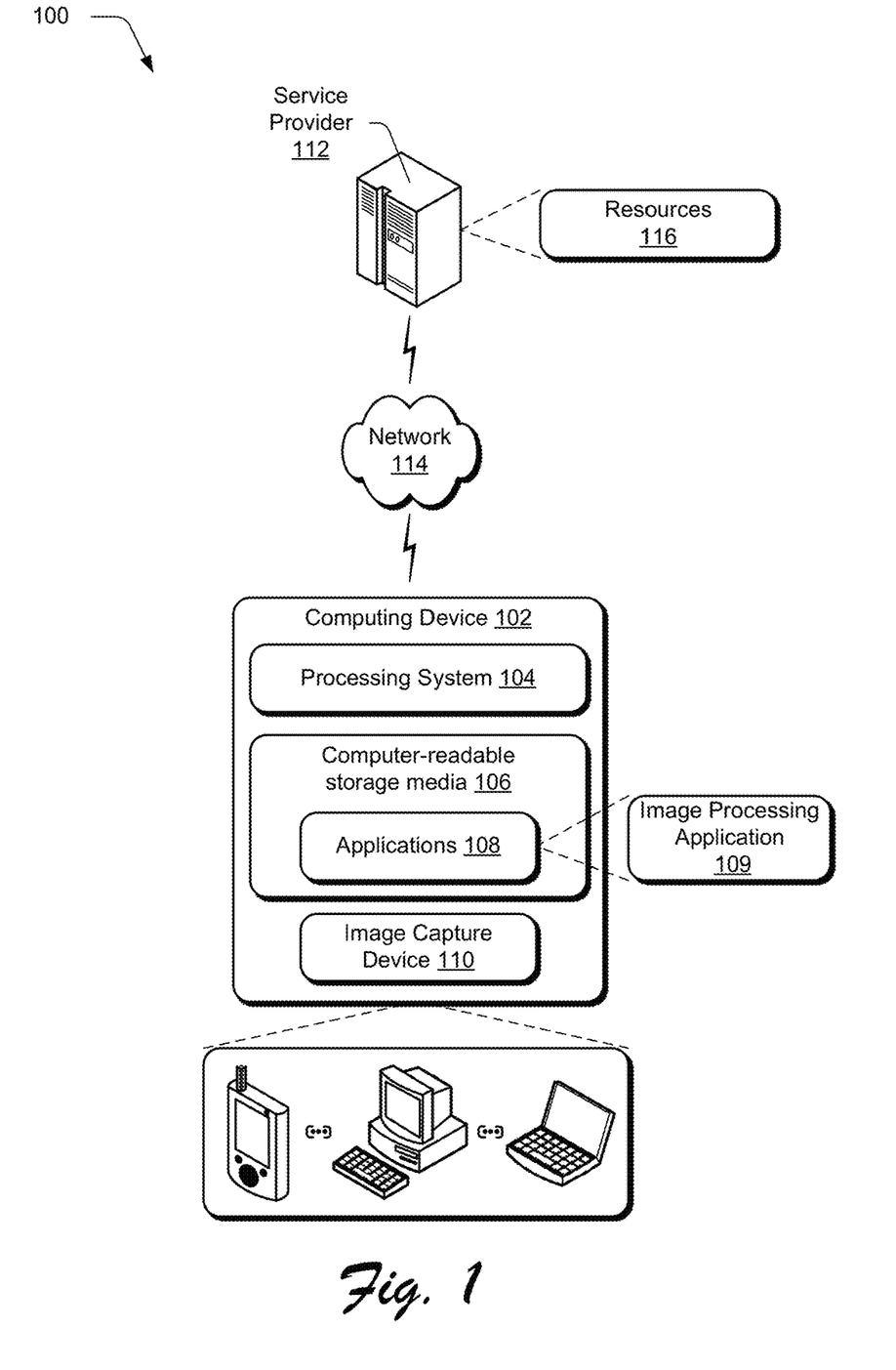
FIG. 1 is an illustration of a digital medium environment in an example implementation that is operable to employ techniques described herein.

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some embodiments, applications 108 may include an image processing application 109. The image processing application 109 is configured to apply object segmentation techniques and, in particular, sky segmentation techniques, as described below in more detail.

Applications 108 may also include a web browser which is operable to access various kinds of web-based resources (e.g., content and services). The applications 108 may also represent a client-side component having integrated functionality operable to access web-based resources (e.g., a network-enabled application), browse the Internet, interact with online providers, and so forth. Applications 108 may further include an operating system for the computing device and other device applications.

The computing device 102 may also, but need not, include an image capture device 110, such as a camera, that can capture images which may be automatically processed, as described below, by image processing application 109.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The digital medium environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service (such as one that employs an image processing application such as image processing application 109), a web development and management service, a collaboration service, a social networking service, a messaging service, an advertisement service, and so forth. Content may include various combinations of assets, video comprising part of an asset, ads, audio, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of an image processing application in accordance with one or more implementations.

Example Image Processing Application

Figure 2:
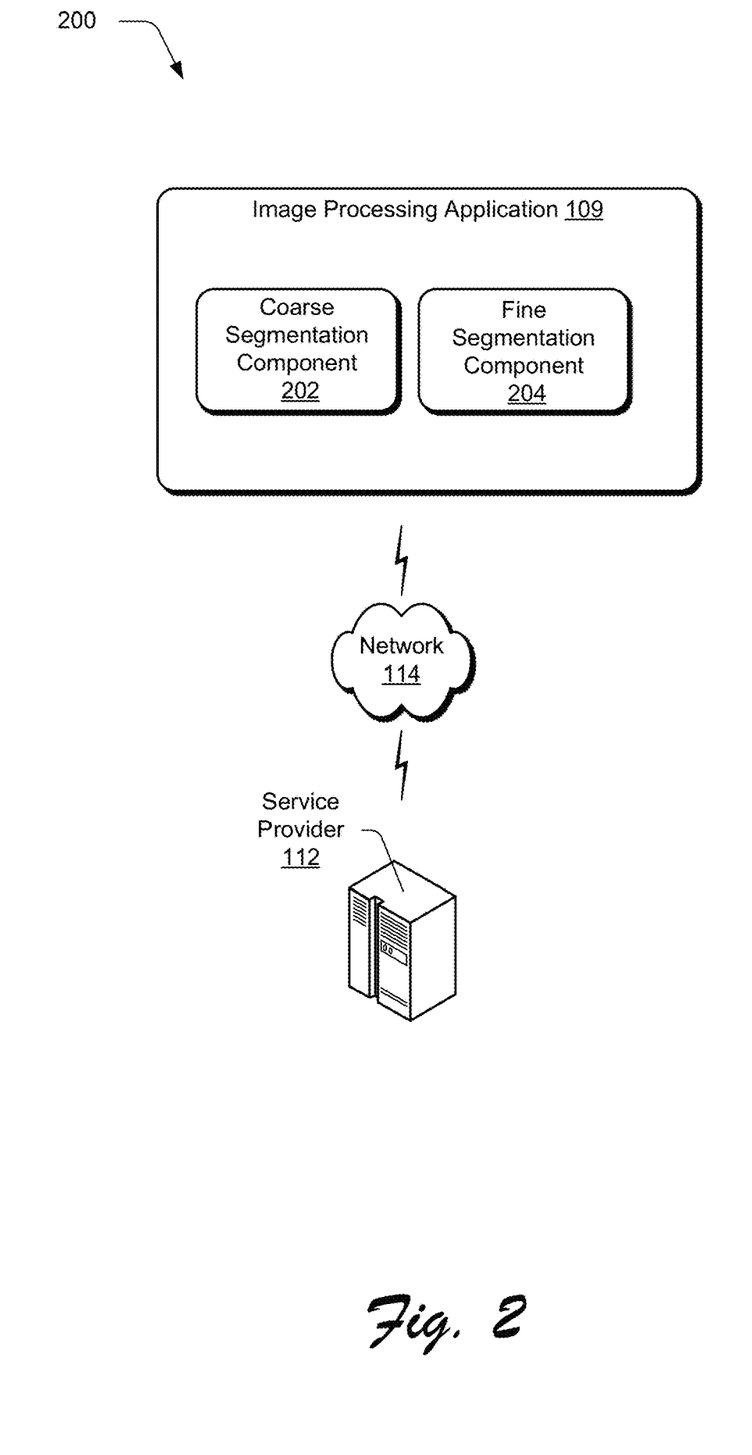
FIG. 2 illustrates an example image processing application including a coarse segmentation component and a fine segmentation component in accordance with one or more implementations.

FIG. 2 illustrates a digital medium environment 200 that includes an example image processing application 109. In this implementation, the image processing application 109 includes coarse segmentation component 202 and a fine segmentation component 204.

Coarse segmentation component 202 is representative of functionality that implements image processing to localize sky regions in various conditions such as sunset, sunrise, and the like. The coarse segmentation component 202 also aims to ensure that non-sky regions with similar sky-like appearances are correctly labeled (e.g., mountains in the far background that do not have clear boundaries with the sky, water surfaces with some reflections, and the like). In one or more embodiments, the coarse segmentation component receives an input image and processes the input image to provide both a local cue and a global cue. The local cue is built by parsing the input image to obtain a probability map, also referred to as a "mask" defining sky and non-sky regions. The global cue is built through an image retrieval process that seeks to determine images that are similar in layout to the input image. This provides a weighted average sky mask. The coarse segmentation component 202 combines the weighted average sky mask from the global cue with the sky probability mask from the local cue to provide a coarse segmentation.

Fine segmentation component 304 is representative of functionality that uses the coarse segmentation to learn online classifiers to provide, on a pixel-by-pixel basis, a probability of being sky or non-sky. The probabilities are used by a graphical model to produce a refined segmentation map. Soft labels can also be assigned around boundaries with alpha mattes to produce more visually pleasing results.

Having considered an example image processing application and its components, consider now a coarse segmentation component and a fine segmentation component in more detail in accordance with one or more embodiments.

Coarse Segmentation Component

Figure 3:
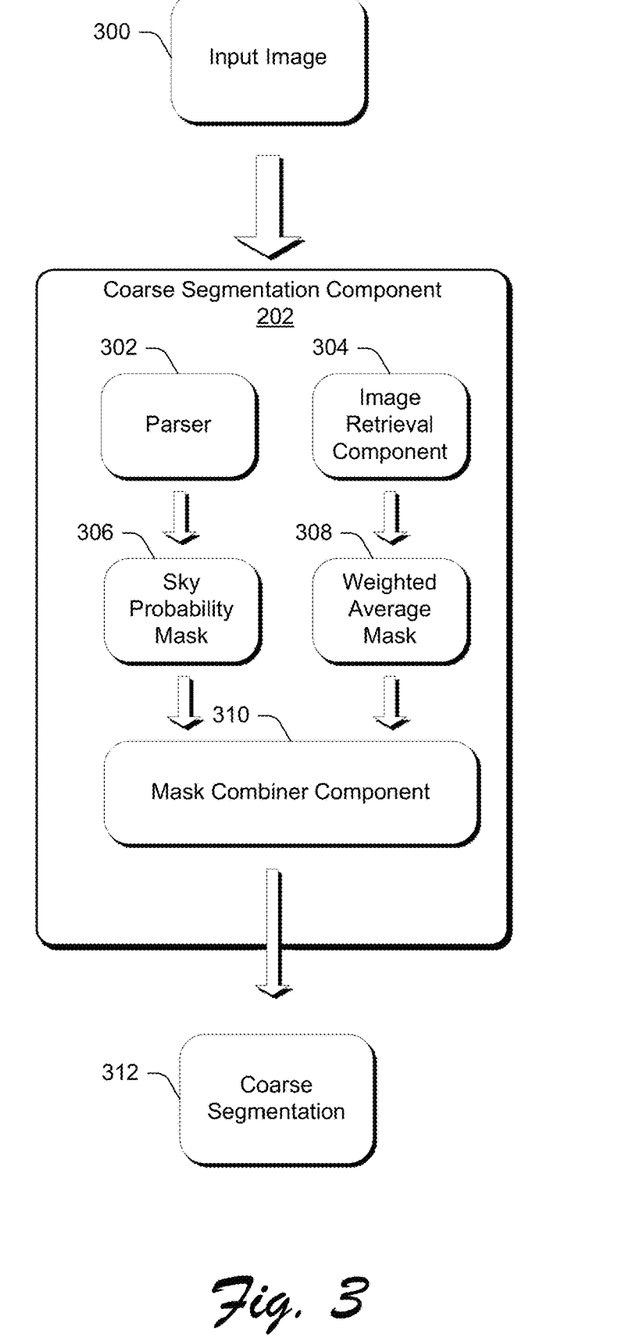
FIG. 3 illustrates a coarse segmentation component in accordance with one or more implementations.

FIG. 3 illustrates an example coarse segmentation component 202 in accordance with one or more embodiments. The coarse segmentation component 202 receives an input image 300 and processes the input image to produce a course segmentation 312 which provides an estimate of the global layout of the input image 300. To do so, in this example, the coarse segmentation component includes or otherwise makes use of a parser 302, an image retrieval component 304, a sky probability mask 306, a weighted average mask 308, and a mask combiner component 310.

When input image 300 is received, parser 302 parses the input image to classify objects that appear in the input image and, more specifically, to classify each pixel as either sky or non-sky. To do this, the parser 302 has been trained to recognize or classify objects into semantic categories including such things as sky, water, roads, trees, mountains, buildings, and various other foreground objects. This facilitates building a local cue, as described above, which localizes the depiction of the sky based on these categories. Any suitable approach can be utilized to parse the input image. In one implementation, parser 302 is implemented to utilize a Conditional Random Field (CRF) to parse the input image. As will be appreciated by the skilled artisan, CRFs are a class of statistical modeling methods that are used for structured prediction. A CRF typically takes into account context, such as relationships between neighboring samples within a particular image. Conditional Random Fields are known and are described in more detail in Domke, J.: *Learning graphical model parameters with approximate marginal interference*. PAMI 35(10) (2013) 2454-2467.

Parsing the image as described above produces a sky probability mask 306 in which each pixel is classified as either sky or non-sky. However, image parsing using a CRF can, in some instances, be problematic insofar as its susceptibility to errors caused by noise sensitivity from different categories. For example, the CRF models the entire scene and is based on low-level color and texture cues. As such, when the low-level appearance of other regions is very similar to the sky, it may still generate a high probability of sky in these regions. Accordingly, the CRF approach can lead to mistakes within the segmentation if left untreated.

To mitigate problems arising from the parser's noise sensitivity, a global cue is built using image retrieval component 304. The image retrieval component essentially utilizes a database of multiple images in which the location of the sky is known. That is, each image in the database has an associated mask which indicates the location of the sky. In this example, the image retrieval component 304 searches to determine other images in its database having a layout that is the same as or similar to the layout of the input image. That is, the image retrieval component searches for images that include sky regions in the same or similar location as the input image. So, for example, if the bottom half of the input image contains depictions of trees and the top half of the input image contains a depiction of the sky, the image retrieval component 304 would search for other images in its database that have the same or similar 50/50 tree/sky layout. These other images would then have masks that are similar to the sky probability mask 306. The masks from these other images from the database are processed to provide a weighted average mask 308. Weighting can be accomplished in any suitable way. For example, in some implementations an equal weight can be used for all retrieved masks which can then be averaged. Alternately, a weight can be assigned that is proportional to a mask's rank in the retrieved list, e.g., the more similar an image is to the input image, the higher the weight assigned to the mask associated with the image.

In one implementation, the image retrieval component 304 is implemented as a Convolutional Neural Network (CNN). Typically in general, CNNs consist of multiple layers of small neuron collections which look at small portions of an input image called receptive fields. The results of these collections are then tiled so that they overlap to obtain a better representation of the original image. This is repeated for every layer. Convolutional Neural Networks are described in more detail in Zhou, B., Lapedriza, A., Xiao, J., Torralba, A., Oliva, A.: *Learning deep features for scene recognition using places database.* NIPS. (2014).

In this particular implementation, histograms of ground truth scene parsing labels on pre-defined spatial grids of the input image are computed. That is, the input image is divided into a pre-defined spatial grid, e.g. a 3×3 grid. In each grid, a pixel count is taken to ascertain how many pixels belong to each semantic label in the ground-truth label map. A histogram is constructed in which the bin number of the histogram is the number of semantic labels, and the value in each bin indicates the percentage of pixels in this grid belonging to each semantic label. Each histogram is concatenated as a feature describing image layout and content. Then, images with these features in a training set are clustered into sub-classes for fine tuning the model. Given a query image (i.e. the input image), images that are similar in layout can be determined and can be retrieved by the image retrieval component 304, and the weighted average sky mask 308 can be computed according to ground truth sky/non-sky labels. In this manner, the sky location can be roughly estimated. However, since the global cue can only infer the location of the sky, it cannot guarantee the accuracy of sky segmentation at the pixel level and around boundaries. Accordingly, mask combiner component 310 is utilized to aggregate or combine the sky probability mask 306 and the weighted average mask 308 to provide the coarse segmentation 312. For example, in some embodiments, the masks can both be resized to the size of the input image. The masks can be combined by performing a pixel-wise average of the two masks. Equal weights can be used when the masks are combined. With the coarse segmentation, sky regions that were mis-classified by the parser 302 can be recovered, as well as details around boundaries that were missed by the image retrieval component 304. The coarse segmentation constitutes a sky probability map which can be normalized from 0 to 1. If the probability is closer to 1, then there is high confidence that the region depicts the sky. If the probability is closer to 0, then there is high confidence that the region depicts non-sky.

In some embodiments, two different thresholds can be employed—a high threshold and a low threshold. If the probability of a particular region is higher than the high threshold, then there is high confidence that the region depicts sky. This region can then be used as a positive example to train online classifiers, as described below. On the other hand, if the probability of a particular region is lower than the low threshold, then there is high confidence that the region depicts non-sky. This region can then be used as a negative example to train the online classifiers. If a particular region has a probability between the low threshold and the high threshold, the region is considered as uncertain and will not be used as training samples to train the online classifiers.

Having considered a coarse segmentation component in accordance with one or more embodiments, consider now a fine segmentation component in accordance with one or more embodiments.

Fine Segmentation Component

Figure 4:
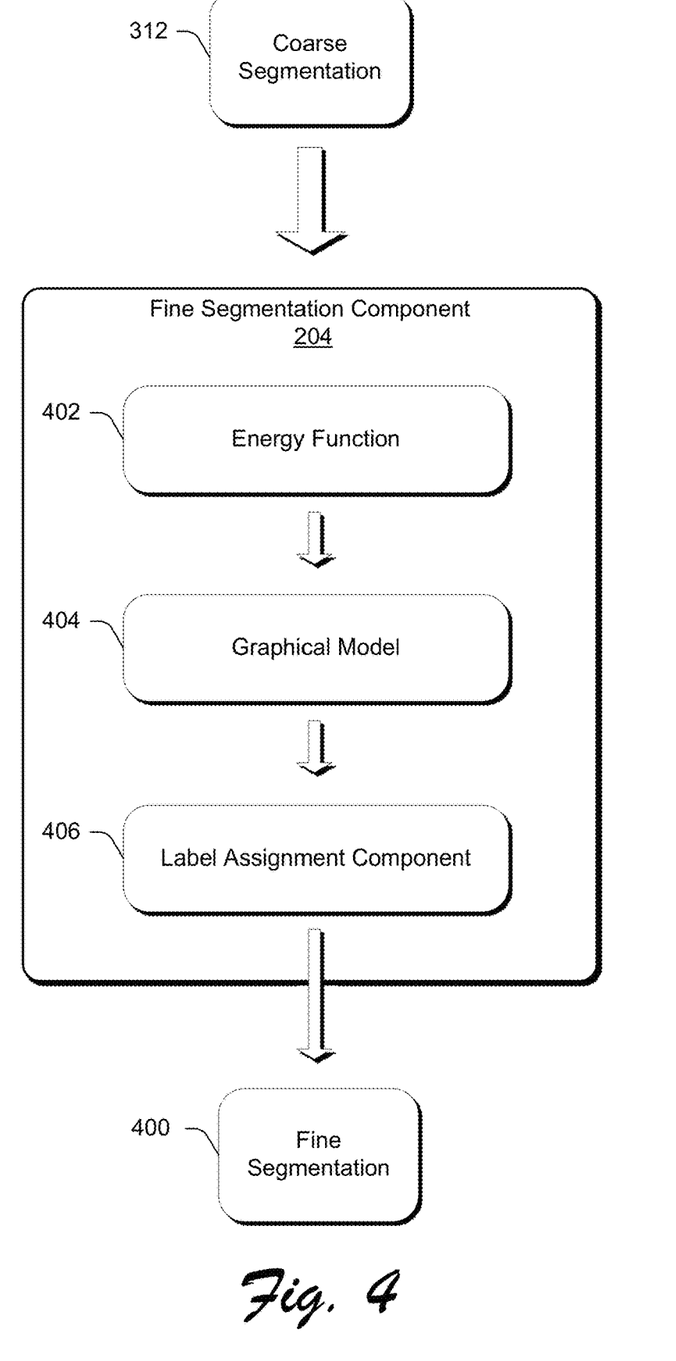
FIG. 4 illustrates a fine segmentation component in accordance with one or more implementations.

FIG. 4 illustrates a fine segmentation component 204 in accordance with one or more embodiments. The fine segmentation component 204 processes the coarse segmentation 312 and provides a fine segmentation 400. To do this, in at least one embodiment, the fine segmentation component 204 utilizes an energy function 402, a graphical model 404 to solve the energy function, and a label assignment component 406.

In the illustrated and described embodiment, the energy function 402 is embodied as a Conditional Random Field energy function that is minimized for the pixel $x_i$ with label $\in \{0,1\}$:

$$E(X) = \lambda_1 \sum_i U_c(x_i) + \lambda_2 \sum_i U_t(x_i) + \lambda_3 \sum_{(i,j) \in \varepsilon} V(x_i, x_j),$$

In the equation, $U_c$ and $U_t$ are color and texture unary potentials respectively, for the cost to be sky or non-sky regions. These terms represent the probability of a pixel being sky or not-sky. For example, for a pixel x, if $U_c$=0.9 with a range [0,1], one would say that the cost of labeling x as non-sky is high. To arrive at these terms, the estimated sky probability map from the coarse segmentation is used to train respective on-line classifiers. Specifically, in the illustrated and described embodiment, Gaussian Mixture Models (GMMs) are used to compute $U_c$ on RGB channels. For example, in the sky region, the RGB color of the sky may be different, e.g., blue background with a white cloud. An assumption is made that the color distribution of the sky regions can be modeled by a weighted combination of M Gaussian density components, in which each Gaussian density captures a mode of color (e.g., one for bluish and one for white). Each Gaussian distribution can be modeled by two parameters—mean and variance. In practice, the number of Gaussian distributions is predefined, for example, M=3 for sky regions, and then the samples from the sky regions are used to estimate the parameters in each Gaussian density component, as well as their weights in the weighted combination. After the model is estimated, given a color from a pixel, it can output a probability of this pixel belonging to this model. Similarly, a Gaussian Mixture Model is also used to estimate non-sky regions. In addition, to consider the texture of the sky and calculate $U_t$, a Support Vector Machine (SVM) is learned on a histogram of gradients. Both the GMMs and the SVM are learned based on superpixels (which represent small segments generated through segmentation), and then probabilities are assigned to every pixel when constructing $U_c$ and $U_t$.

The V term represents the pairwise potential for smoothness in a set ε of adjacent pixels. Essentially, this term looks at adjacent pixels and if they are smooth with respect to each other, meaning that there are little or no visual edges or boundaries such that the pixels lie in the same region, a penalty is assigned for labeling the pixels with different labels (i.e. sky and non-sky). If, on the other hand, there are strong edges between adjacent pixels, meaning that there is a visual edge between the pixels, there is little or no penalty to labeling the pixels with different labels (i.e. sky and non-sky). In the illustrated and described embodiment, for the pairwise term V, the magnitude of the gradient between the two adjacent pixels is utilized. $\lambda_k$ are the weights for each term.

In the illustrated and described embodiment, the graphical model 404 is utilized to solve, i.e., minimize the energy function, described above, to efficiently obtain the final pixel-wise label assignments of sky and non-sky. In this particular example, the graphical model 404 utilizes graph cuts to solve the energy function. As will be appreciated by the skilled artisan, graph cuts can be employed to efficiently solve a wide variety of computer vision problems such as image smoothing and other problems that can be formulated in terms of energy minimization. Such energy minimization problems can be reduced to instances of the maximum flow problem in a graph and thus, by the max-flow min-cut theorem, define a minimal cut of the graph. Thus, the term "graph cuts" is applied specifically to those models which employ a max-flow min-cut optimization. Graph cuts are described in more detail in Boykov, Y., Kolmogorov, V.: *An Experimental comparison of min-cut/max-flow algorithms for energy minimization in vision*. PAMI (2004) 1124-1137.

In the illustrated and described embodiment, the segmentation may not be satisfied for fine details such as sky holes amongst a tree region and the like. In order to address and mitigate this issue, soft labels are assigned around the boundary with alpha mattes. For example, consider that the image is composed of the background sky layer B and the foreground layer F. An alpha matte defines the transparent/opacity areas of the background and the foreground layer. That is, the actual pixel color is a combination of background color and foreground color: C=alpha*F+(1−alpha)B. Inside the foreground, alpha is usually equal to "1", and inside the sky region alpha is equal to "0". However, around the boundaries, especially small foreground regions such as tree branches, alpha values usually fall between "0" and "1". Accordingly, the final fine segmentation result is a more visually desirable.

Having considered a fine segmentation component, consider now an example method in accordance with one or more embodiments.

Example Method

Figure 5:
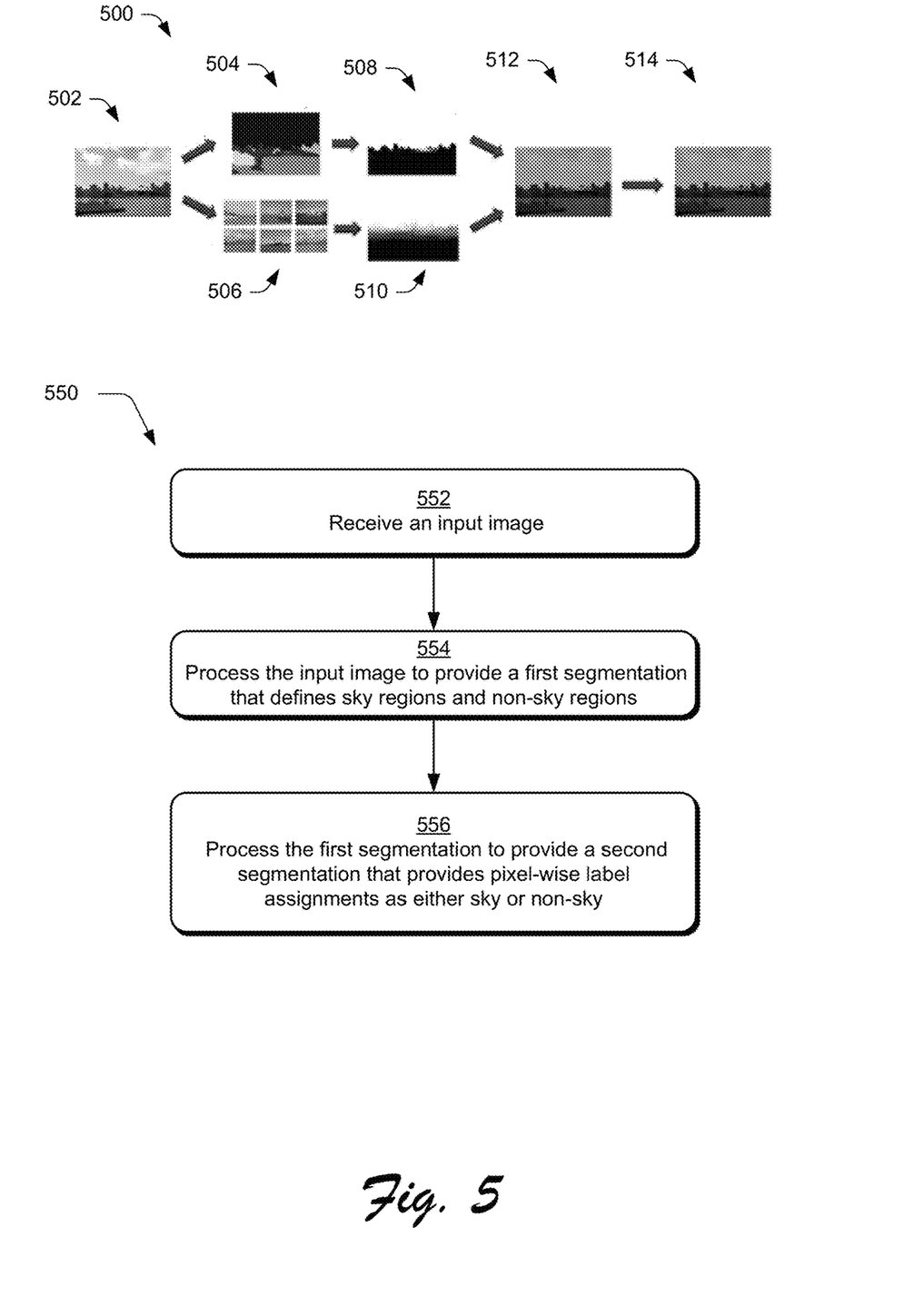
FIG. 5 is a flow diagram depicting an example procedure in accordance with one or more implementations.

FIG. 5 illustrates an example segmentation flow 500 in combination with an example procedure 550 for performing segmentation in accordance with one or more embodiments. Segmentation flow 500 constitutes but one way of implementing the procedure 550. In this particular example, the segmentation is a sky segmentation which seeks to segment portions of an image into sky and non-sky regions. As noted above however, the segmentation techniques can be applied to objects other than sky, without departing from the spirit and scope of the claimed subject matter. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed in a digital medium environment by a suitably configured device, such as the example computing device 102 of FIG. 1 that makes use of an image processing application 109, such as that described above.

An input image that includes an object region to be segmented, e.g., a depiction of a sky region, is received for segmentation processing (block 552). An example input image is shown in flow 500 at 502. There, the input image includes a depiction of a sky region in the upper half of the image and a depiction of a non-sky region in the lower half of the image. The input image is processed to provide a first segmentation that defines sky regions and non-sky regions (block 554). An example first segmentation is shown in flow 500 at 512. In one embodiment, this procedure can be performed by building a local cue and a global cue as described above.

The local cue is built by parsing the input image to classify objects that appear in the input image. A parsed input image in which objects have been classified appears in flow 500 at 504. One example of how this can be performed is described above. Parsing the input image as such produces a sky probability mask which is shown in flow 500 at 508. In the sky probability mask, as described above, each pixel is classified as either sky or non-sky.

The global cue is built by using an image retrieval process to retrieve images from a database that have a layout that is the same as or similar to the input image. The input image retrieval process results in retrieving multiple images which are illustrated in flow 500 at 506 where six different retrieved images are shown. An example of how this can be done is provided above. The retrieve images or, more accurately, each image's associated mask is collectively processed to provide a weighted average mask. The weighted average mask is illustrated in flow 500 at 510. The sky probability mask 508 and the weighted average mask 510 are then aggregated or combined to provide the first segmentation 512 which, in the above example, is referred to as the coarse segmentation.

The first segmentation is processed to provide a second segmentation that provides pixel-wise label assignments as either sky or non-sky (block 556). An example second segmentation is shown at 514. In the example described above, processing the first segmentation includes using a CRF energy function that includes a color term, a texture term and a pairwise term. The color term and texture term are unary potentials that represent the probability of a pixel being sky or non-sky. These terms are provided by using the first segmentation to train respective online classifiers. For the color term, Gaussian Mixture Models are employed as described above. For the texture term, a Support Vector Machine (SVM) is employed. The pairwise term considers the smoothness with respect to adjacent pixels in the first segmentation. Graph cuts are then employed to solve or minimize the energy function which, in turn, provides final pixel-wise label assignments as either sky or non-sky. Further processing can include utilizing alpha mattes to assign soft labels around boundaries as described above.

Having considered an example procedure in accordance with one or more implementations, consider now an example system and device that can be utilized to practice the inventive principles described herein.

Example System and Device

Figure 6:
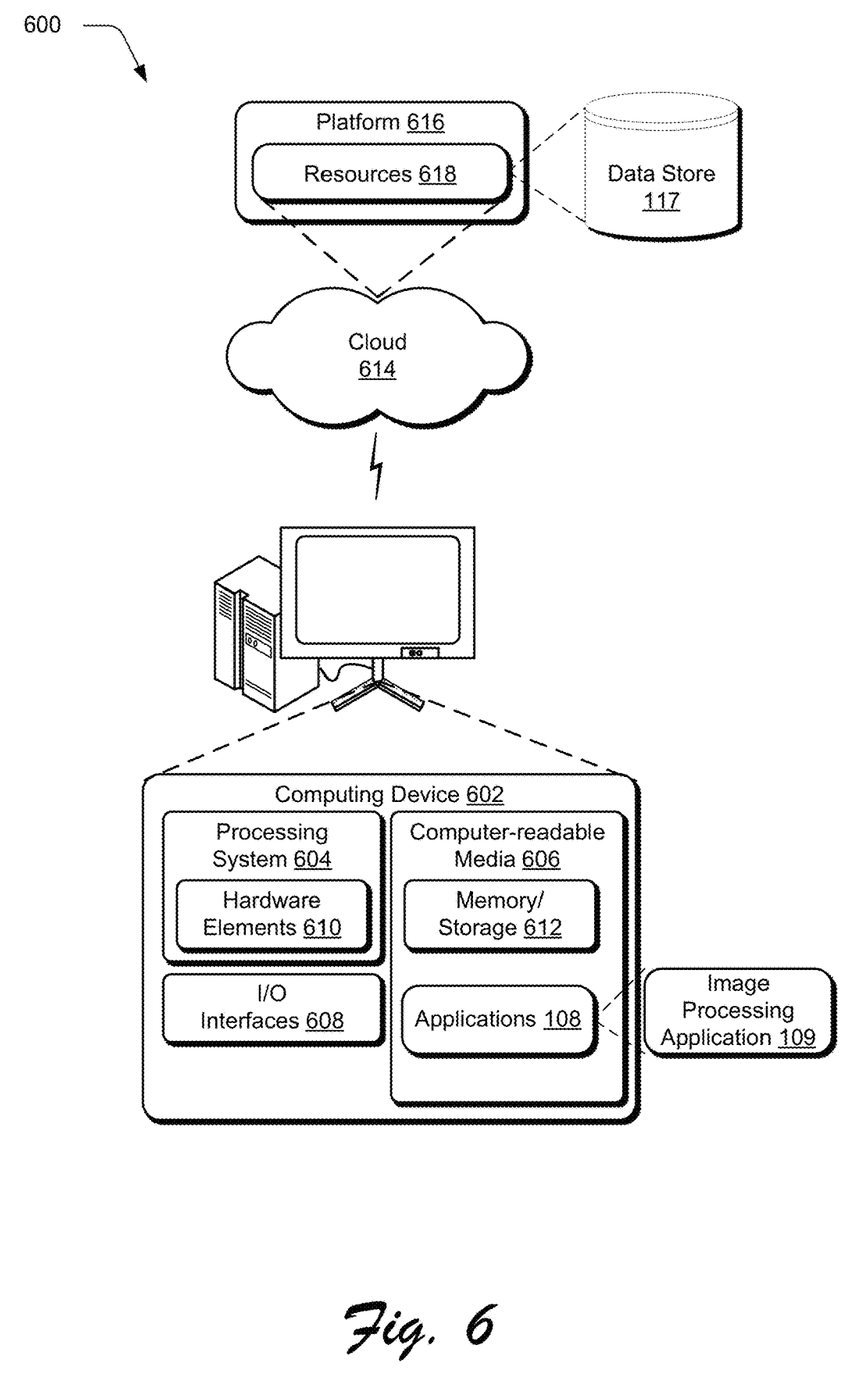
FIG. 6 illustrates an example system including various components of an example device that can be employed for one or more search implementations described herein.

FIG. 6 illustrates an example system generally at 600 that includes an example computing device 602 that is representative of one or more computing systems and/or devices that may implement the various techniques described herein. This is illustrated through inclusion of the applications 108 and, in particular, image processing application 109, which operates as described above. The computing device 602 may be, for example, a server of a service provider, a device associated with a client (e.g., a client device), an on-chip system, and/or any other suitable computing device or computing system.

The example computing device 602 includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

In one or more implementations, a digital medium environment includes an image processing application that performs object segmentation on an input image. An improved object segmentation method implemented by the image processing application comprises receiving an input image that includes an object region that is to be segmented by a segmentation process, processing the input image to provide a first segmentation that defines the object region, and processing the first segmentation to provide a second segmentation that provides pixel-wise label assignments for the object region.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including an image processing application that performs object segmentation on an input image, an improved object segmentation method implemented by the image processing application, the method comprising:

receiving an input image that includes an object region to be segmented;

processing the input image to provide a first segmentation that defines the object region, said processing comprising:

parsing the input image to provide a probability mask which classifies individual pixels in the input image;

determining, from a database, multiple images which have layouts at least similar to a layout of the input image, wherein the multiple images include respective masks;

processing the respective masks to provide a weighted average mask; and combining the probability mask and the weighted average mask to provide the first segmentation.

2. A method as described in claim 1, wherein the object region to be segmented comprises a depiction of a sky.

3. A method as described in claim 1, wherein parsing the input image to provide the probability mask comprises parsing the input image using a Conditional Random Field to provide the probability mask.

4. A method as described in claim 1, wherein determining the multiple images from the database comprises using a Convolutional Neural Network to determine multiple images from the database.

5. A method as described in claim 1, wherein:

parsing the input image to provide the probability mask comprises using a Conditional Random Field to provide the probability mask;

determining the multiple images from the database comprises using a Convolutional Neural Network to determine the multiple images from the database.

6. A method as described in claim 1, wherein the object region to be segmented comprises a depiction of a sky, and wherein parsing the input image to provide the probability mask comprises parsing the input image using a Conditional Random Field to provide the probability mask.

7. A method as described in claim 1, wherein the object region to be segmented comprises a depiction of a sky, and wherein determining the multiple images from the database comprises using a Convolutional Neural Network to determine multiple images from the database.

8. A method as described in claim 1, wherein the object region to be segmented comprises a depiction of a sky, and wherein:

parsing the input image to provide the probability mask comprises using a Conditional Random Field to provide the probability mask;

determining the multiple images from the database comprises using a Convolutional Neural Network to determine the multiple images from the database.

9. A method as described in claim 1, further comprising processing the first segmentation to provide a second segmentation, wherein said processing the first segmentation to provide the second segmentation comprises computing a color unary potential and computing a texture unary potential that respectively represent a probability of a pixel in the input image being a part of the object region or not a part of the object region.

10. A method as described in claim 1, further comprising processing the first segmentation to provide a second segmentation, wherein said processing the first segmentation to provide the second segmentation comprises computing a color unary potential and computing a texture unary potential that represent a probability of a pixel in the input image being a part of the object region or not a part of the object region, wherein the color unary potential is computed using Gaussian Mixture Models and the texture unary potential is computed using a Support Vector Machine.

11. A method as described in claim 1, further comprising processing the first segmentation to provide a second segmentation, wherein said processing the first segmentation to provide the second segmentation comprises computing a color unary potential and computing a texture unary potential that represent a probability of a pixel in the input image being a part of the object region or not a part of the object region, and computing a pairwise term based on a gradient magnitude between adjacent pixels in the input image.

12. In a digital medium environment in which a computing device can use an image processing application to perform object segmentation, one or more computer-readable storage media comprising instructions that are stored thereon that, responsive to execution by the computing device, perform operations comprising:
   receiving an input image that includes an object region to be segmented;
   processing the input image to provide a first segmentation that defines the object region, said processing comprising:
      parsing the input image to provide a probability mask which classifies individual pixels in the input image;
      determining multiple images from a database which have layouts at least similar to a layout of the input image, wherein the multiple images include respective masks
      processing the respective masks to provide a weighted average mask; and
      combining the probability mask and weighted average mask to provide the first segmentation.

13. The one or more computer-readable storage media as described in claim 12, wherein the object region to be segmented comprises a depiction of a sky.

14. The one or more computer-readable storage media as described in claim 12, wherein said parsing comprises parsing the input image using a Conditional Random Field to provide a probability mask which classifies individual pixels in the input image.

15. The one or more computer-readable storage media as described in claim 12, wherein determining the multiple images from the database comprises using a Convolutional Neural Network to determine multiple images from the database.

16. The one or more computer-readable storage media as described in claim 12, further comprising processing the first segmentation to provide a second segmentation that provides pixel-wise label assignments for the object region, wherein processing the first segmentation to provide the second segmentation comprises computing a color unary potential and computing a texture unary potential that represent a probability of a pixel in the input image being a part of the object region or not a part of the object region, and computing a pairwise term computed based on a gradient magnitude between adjacent pixels in the input image.

17. The one or more computer-readable storage media as described in claim 16, wherein said processing the first segmentation to provide a second segmentation comprises computing the color unary potential comprises using Gaussian Mixture Models and computing the texture unary potential comprises using a Support Vector Machine.

18. A system implemented in a digital medium environment including a computing device having an image processing application to enable object segmentation, the system comprising:
   a processing system;
   one or more computer readable media storing instructions executable via the processing system to implement an image processing application configured to perform operations comprising:
   receiving an input image that includes an object region to be segmented;
   processing the input image to provide a segmentation that defines the object region, said processing comprising:
      parsing the input image to provide a probability mask which classifies individual pixels in the input image;
      determining, from a database, multiple images which have layouts at least similar to a layout of the input image, wherein the multiple images include respective masks;
      processing the respective masks to provide a weighted average mask; and
      combining the probability mask and the weighted average mask to provide the segmentation.

19. The system as described in claim 18, wherein:
   said parsing is performed using a Conditional Random Field; and
   said determining multiple images comprising using a Convolutional Neural Network to determine the multiple image.

20. The system as described in claim 18, wherein the object region to be segmented comprises a depiction of a sky.

* * * * *